(No Model.)

L. L. RYERSON.
ROLLER SKATE.

No. 294,082. Patented Feb. 26, 1884.

Witnesses
S. N. Piper
E. B. Pratt

Inventor.
Lucius Lorenzo Ryerson.
by R. H. Eddy atty.

UNITED STATES PATENT OFFICE.

LUCIUS LORENZO RYERSON, OF BOSTON, MASSACHUSETTS.

ROLLER-SKATE.

SPECIFICATION forming part of Letters Patent No. 294,082, dated February 26, 1884.

Application filed November 1, 1883. (No model.)

*To all whom it may concern:*

Be it known that I, LUCIUS LORENZO RYERSON, of Boston, in the county of Suffolk, of the Commonwealth of Massachusetts, have invented a new and useful Improvement in Roller-Skates; and I do hereby declare the same to be described in the following specification and represented in the accompanying drawings, of which—

Figure 1:
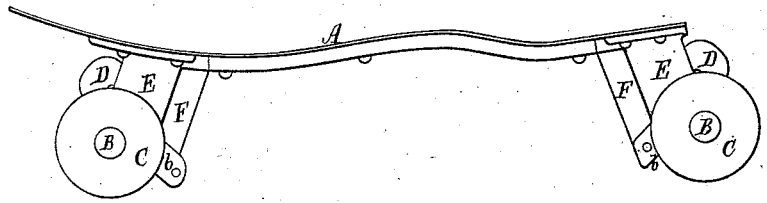
Figure 2:
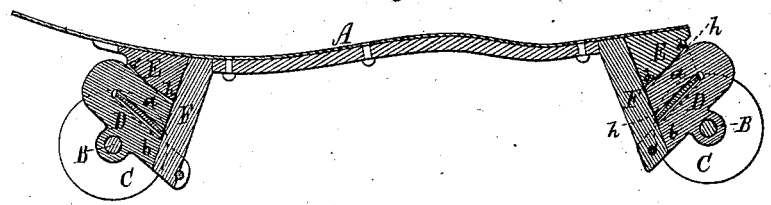
Figure 3:
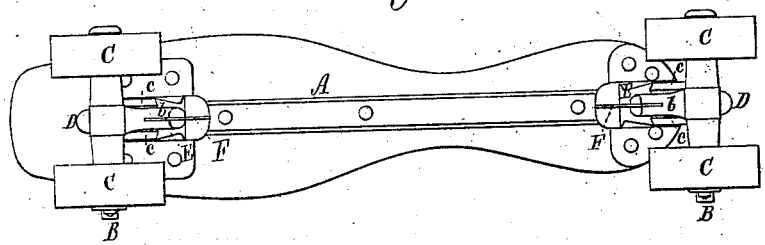
Figure 4:
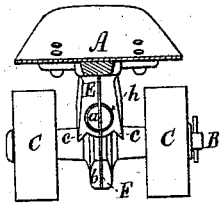

Figure 1 is a side view, Fig. 2 a longitudinal section, Fig. 3 a bottom view, and Fig. 4 a transverse section, of a roller-skate provided with my invention, the nature of which is defined in the claims hereinafter presented.

In said drawings, A denotes the shoe-support, B B the axles, and C C C C the four wheels, of a roller-skate in their usual arrangement with each other. At its middle each axle is attached to one of two inclined "goose-necks," D D, each of which has a cylindrical journal, $a$, to enter and turn in one of two bearings, E E, fastened to and projecting downward from the plate A, they being arranged therewith as represented. Each goose-neck extends in opposite directions beyond its journal, and is connected to the bearing E by a metallic spring, F, going from one to the other, and arranged with them in manner as shown.

The lower limb, $b$, of the goose-neck is between two stops or lips, $c\ c$, extending from the bearing E, such bearing between the stops being curved, to admit of the limb vibrating from one to the other of them, it, by the spring, being brought to its median position with respect to them. The journal-receiving hole $h$ in the bearing is smallest in diameter at its middle, and from thence is conical in each direction therefrom, as shown at $d\ d$, such being to allow of the axle having a slight vibratory movement, as well as a pendulous one, under the plate. While the spring allows of the axle having such movements to facilitate the operations of a skater and enable him, while skating, to keep the wheels in contact with the floor, it serves to restore the parts to their normal positions as circumstances may require.

In my improvement the spring, besides its other duties, operates to connect the goose-neck to the bearing, and to maintain them in their due relations with each other.

My improvement renders unnecessary any rubber cushions or springs, as usually applied, for supporting the wheel-axle.

In the roller-skate, I claim—

1. The wheel-axle goose-neck and its journal-bearing, provided with the metallic spring connected to and arranged with them substantially as set forth.

2. The wheel-axle goose-neck journal-bearing provided with the lips or lateral stops, in combination with the said goose-neck, and with the spring connecting it with the said bearing and arranged therewith as represented.

3. The goose-neck bearing having the duplex conical bore, as and arranged in it as set forth, in combination with the goose-neck connected to such bearing by a metallic spring arranged as represented, and provided with a cylindrical journal to work in the bearing, as specified.

LUCIUS LORENZO RYERSON.

Witnesses:
R. H. EDDY,
E. B. PRATT.